United States Patent
Kramer

[11] Patent Number: 5,622,621
[45] Date of Patent: Apr. 22, 1997

[54] FLUID/LIQUID SEPARATOR

[75] Inventor: Robert W. Kramer, Friendswood, Tex.

[73] Assignee: United Technologies Corporation, Hartford, Conn.

[21] Appl. No.: 534,765

[22] Filed: Sep. 27, 1995

Related U.S. Application Data

[62] Division of Ser. No. 219,587, Mar. 29, 1994, Pat. No. 5,484,521.

[51] Int. Cl.[6] .................................................. B01D 17/038
[52] U.S. Cl. ............................ 210/188; 96/214; 210/209; 210/512.3; 494/49; 494/50; 494/900
[58] Field of Search ........................... 210/188, 512.1, 210/512.3, 209; 96/208, 214, 216, 217; 494/49–52, 84, 900

[56] References Cited

U.S. PATENT DOCUMENTS

| | | | |
|---|---|---|---|
| 3,031,974 | 5/1962 | Edwards | 96/217 |
| 3,045,602 | 7/1962 | Adams | 96/217 |
| 3,073,249 | 1/1963 | Yokota et al. | 96/217 |
| 3,276,679 | 10/1966 | Booth | 494/900 |
| 3,876,135 | 4/1975 | Harvey et al. | 494/49 |

*Primary Examiner*—Joseph W. Drodge
*Attorney, Agent, or Firm*—Norman Friedland

[57] ABSTRACT

A rotating drum divided in axial spaced compartments with one of the compartments includes paddles and coalescing material to separate the fluid from the liquid and the other compartment includes a stationary third pump and a stationary water pump for effectively separating fluid such as oil or gas from liquid such a water. Another embodiment includes a simplified version of the fluid/liquid separator adapted for zero gravity environment and includes a device for purging the lines from air prior to pumping the liquid. An electrical sensing circuit including conductivity sensors or an electronic controller including pressure sensors serve to control the rate of removal of the separated component or controlling the purging device.

7 Claims, 6 Drawing Sheets

FLUID/LIQUID SEPARATOR

This is a division of application Ser. No. 08/219,587 filed on Mar. 29, 1994 now U.S. Pat. No. 5,484,521.

TECHNICAL FIELD

This invention relates to a fluid separator that can separate mixtures whose components are of different densities and more specifically for separating the components of oil and water or air and water mixtures.

BACKGROUND ART

It is well known that there is a need for a practical oil/water separator that can cleanse oil spills that occur in bodies of water, such as the oceans, rivers, lakes, and streams. While there are different fluid separation techniques, all of these have drawbacks which render them inadequate to meet present day needs.

One such system, for example, is exemplified in U.S. Pat. No. 3,742,095 granted to Mensing et al on Jul. 3, 1973 entitled "Vortex Flow System" for Separating Oil from an Oil-Water Mixture and commonly assigned to United Technologies Corporation, is a system and apparatus that was intended to cleanse the seas by employing an improved vortex separator. Other systems have been contemplated that centrifuge the fluid in a rotating drum causing the denser liquid to centrifuge to gravitate to the periphery of the rotating drum where it can be collected by a stationary pitot tube immersed in the fluid. The pitot tube, however, creates fluid turbulence which limits the water purity attainable with this concept. This turbulence also increases power consumption, a critical consideration in space-based applications where available power is limited.

Other separation techniques do not rely on centrifugation of the fluid mixture to achieve separation. One such method includes burning the oil once it has been contained. Typically, containment is by use of floating booms that are positioned into place by the use of a vessel. Problems with this approach are that the oil is not recovered, air pollution is generated by the burning process, and the oil is not completely consumed by the burning, hence, the cleanup is incomplete.

Another method utilizes skimmers which pick up oil along with the water from the water surface. The skimming may be by vacuum pumps which pump the oil/water mixture in to a compartment in the hull of a ship. Another approach would be to force the mixture into a compartment by the use of belt skimmer. In either case, the primary mechanism for separation is gravity, i.e. oil which is less dense than water rises to the top of the compartment. Obviously, in addition to the fact that this process is slow, it also has the disadvantage that it requires many more trips to carry the oil/water mixture to off shore containers where the oil is allowed to settle at the top, than it would otherwise require if complete separation were achieved at sea. This is so because if complete separation were achieved at sea, the water could be pumped overboard and the entire compartment would be available for oil storage. Furthermore, separation efficiency by gravity is not nearly as good as with centrifugal separation, since with the latter, several thousand times the gravitational acceleration can be achieved by the rotation of the fluid mixture.

I have found that I can obviate the problems enumerated in the above paragraphs and in accordance with this invention I provide a practical and efficacious centrifugal fluid separator that can be utilized to clean up marine oil spills. It is contemplated that this invention can be utilized to separate the components of any fluid mixture when the components are of different densities.

As one skilled in this art will appreciate the concept of this invention is particularly suited for separating oil from an oil/water mixture however, it affords a multitude of applications for fluid component separation and hence it is not limited in use for oil/water separation. For example, as will become evident from the description to follow, the same basic concept, with some minor modifications, could be used for separation of gas from liquid/gas mixtures, which is a critical process in spacecraft life support systems. Likewise, depending on whether high output flow or high pressure rise is desired slightly different configuration of certain components may be utilized to meet these needs. It will become readily apparent that the description of the preferred embodiment of the water/oil separator will provide a basis for understanding how the invention can be applied for use in other environments, since the same basic principles of operation apply in all cases.

SUMMARY OF THE INVENTION

An object of this invention is to provide an improved fluid separator.

According to this invention and when used to separate oil from an oil/water mixture, a rotating drum centrifugally separates the oil and water and the heavier water is forced to the periphery of the drum. Circular disk pumping assemblies are used to collect the separated fluids and transport them out of the separator. The rotating drum consists of two compartments. In the upstream compartment, oil and water are separated and oil is pumped out of the rotating drum. In the downstream compartment water is pumped out of the assembly. An energy recovery disk located between the two compartments serves to transport the water flow exiting the upstream compartment from the periphery of the rotating drum where it enters the downstream compartment and then pumped to the separator outlet.

A feature of this invention is the use of a conductivity sensor to control the level of the oil/water interface in the upstream compartment of the drum.

Another feature of this invention is the provision of several layers of coalescing mesh in the upstream compartment of the rotating drum. The mesh serves to help the oil coalesce and thus aids the separation process.

Another feature of this invention is the use of impeller blades embedded in the coalescer mesh that accelerates the incoming fluid mixture.

The improved fluid separator is characterized as being relatively light in weight, compact in size, and capable of removing virtually all of the oil from the water at substantially high rates with a considerable avoidance of high power consumption as would be necessary in heretofore known water separators utilizing pitot tubes to collect and transport the separated fluids. The purity of the oil can readily be controlled by controlling the residence time in the separator and the rotational speed of the drum.

This invention includes certain features which are deemed unique in fluid separators and because of the uniqueness afford certain benefits which, without intending to limit the scope of this invention, are listed hereinbelow:

1) The circular disk pumping assemblies of this invention collect the separated fluids and transport them out of the separator while avoiding turbulence and thereby reducing power consumption.

2) The utilization of the two compartments in the rotating drum isolates the water pumping function from the oil/water interface in the upstream compartment resulting in greater purity of water output.

3) The energy recovery disk directs water from the periphery of the rotating drum radially inward to the water pump inlet while preventing the energy losses due to fluid shear which would occur if the energy recovery disk were not present.

4) The conductivity sensors control the level of the oil/water interface in the upstream compartment, thus assuring that the water removed from the separator is not contaminated with oil.

5) The layers of mesh coalesce the fluids to improve the oil/water separation performance and the embedded impeller blades reduce turbulence during the acceleration of the fluid.

The foregoing and other features of the present invention will become more apparent from the following description and accompanying drawings.

BEST MODE FOR CARRYING OUT THE INVENTION

While the preferred embodiment of this invention is being described as a water/oil separator for cleansing oil spills in the seas, as one skilled in this art will appreciate, this invention has utility for other applications and can operate to separate other media. Additionally with minor modifications this invention can be adapted to operate in a zero gravity or partial gravity environment for separating a gaseous and liquid mixture.

Figure 1:
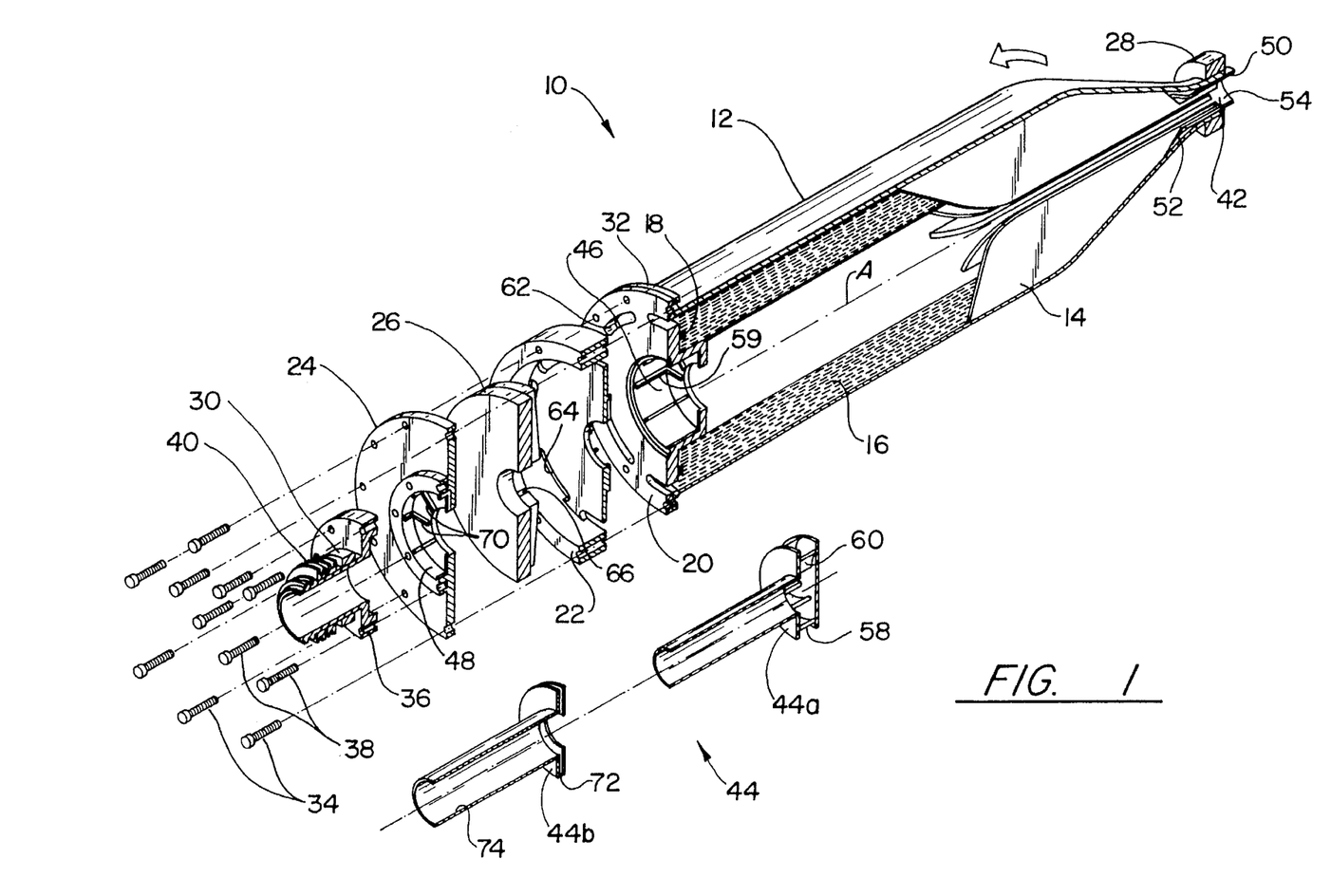
FIG. 1 is a cut away perspective view in elevation of the oil/water configuration of the fluid separator illustrating the details of this invention.
Figure 2:
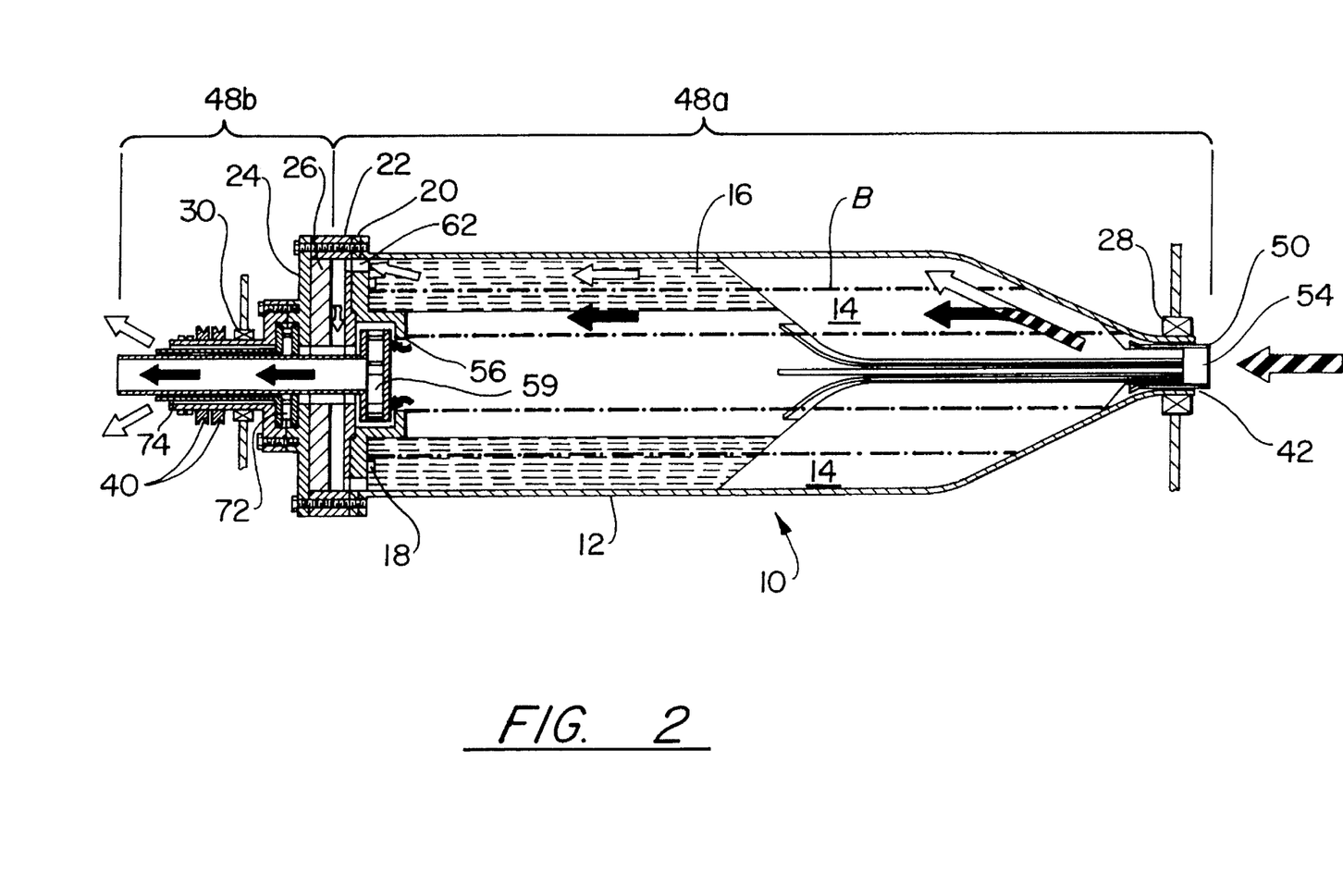
FIG. 2 is a sectional and schematic representation of the embodiment depicted in FIG. 1.

As best seen in FIGS. 1 and 2, the fluid separator for separating the components of an oil/water mixture is generally indicated by reference numeral 10 as comprising rotating major components and stationary major components listed hereinbelow for the sake of convenience and for simplifying the description of this invention: (It being understood that the embodiment depicted in FIGS. 1 & 2 exemplify the basic principles of all the embodiments described herein).

| ref. no. | component |
|---|---|
| ROTATING COMPONENTS: | |
| 12 | rotating drum |
| 14 | Impeller vanes |
| 16 | coalescer |
| 18 | conductivity electrodes |
| 20 | Oil pump housing |
| 22 | rotating drum divider |
| 24 | water pump housing |
| 26 | energy recovery disk |
| 28/30 | bearings |
| 32 | slip rings |
| 34 | water pump housing bolts |
| 36 | outlet tube assembly |
| 38 | outlet tube assembly bolts |
| 40 | pulley wheels (belt drive) |
| STATIONARY COMPONENTS: | |
| 42 | stationary inlet |
| 44 | disk pump assembly |
| 44a | oil pump disk |
| 44b | water pump disk |

The disk pump assembly 44 consists of the oil pump disk 44a and the water pump-disk 44b where the oil pump disk 44a fits inside the oil pump cavity 46 of the rotating drum 12 and the water pump disk 44b fits inside the water pump cavity 48.

The rotating drum 12 is generally cylindrical in shape and converges in a frusto-conically shaped forward end defining a circular opened end and is supported between the suitable bearings 28 and 30 for rotary movement about the central axis A. The diameter of stationary sleeve 50 which is disposed concentrically and coaxially at the opened end is smaller than the diameter of the opened end and defines an outer annular passage 52 for venting air and an inner passage for defining the inlet 54.

The rotating drum essentially is divided into two distinct compartments, 48a and 48b. Compartment 48a is located at the fore end of the separator adjacent to the inlet and extends between the inlet and up to and including the oil pump housing 20 and compartment 48b extends in the aft direction from the oil pump housing 20 to the outlet of the separator. As will be appreciated by the description to follow, by isolating the water pumping function from the oil/water interface, a greater purity of the water output is attainable. This also lends itself to incorporating the energy recovery disk 26 which is mounted between the rotating drum divider 22 and the water pump housing 24 and which enables power consumption to be reduced.

The oil/water mixture enters the rotating drum 12 through the inlet 54 and immediately impinges the circumferentially spaced impeller vanes 14 which extend radially inward from the inner diameter of the rotating drum 12 toward the axis A. While the number of vanes are dependent on the particular application, in the preferred embodiment the number of vanes are eight (8). The vanes are contoured such that upon impingement, the mixture is rapidly accelerated to the rotational speed of the rotating drum 12. The forces due to centripetal acceleration of the mixture cause the components to separate. Since the water is the denser i.e. heavier fluid, it will be driven to the periphery of rotating drum 12 and form into a cylindrical mass conforming to the shape of the inner surface of rotating drum 12. The oil which is the less dense fluid, i.e. lighter, will be driven closer to axis A and forms on the inner diameter of the water mass a cylindrical mass concentric and contiguous to the mass of water and rotates therewith at the same rotational speed. A distinct interface of the oil/water will form as represented by the dashed line B. Since the forces due to centripetal acceleration may be many thousand times the force of gravity, the separation by the rotating drum occurs very rapidly and efficiently.

To more effectively perform the separation process a suitable coalescer 16 may be utilized. Coalescer 16 is comprised of porous filter mesh that is in sheet form and either helically wound or formed in layers and extends in the rotating drum 12 from the forward to the rearward end. The coalescing filter mesh provides surface area on which the oil droplets coalesce into larger droplets thusly, enhancing separation.

The level of the separated oil in the rotating drum 12 is determined by the diameter of the entrance 56 to the oil pump housing 20. Since this diameter is slightly larger than the inside diameter of the inlet 54 of the rotating drum 12 there is a clearance between the surface of the separated oil and the outside diameter of the sleeve 50 of stationary inlet 42. Any air trapped in the oil/water mixture will escape to ambient through the annular passage 52.

As the separated oil and water flow axially toward the outlet end of rotating drum 12, the continued action of centripetal acceleration forces serves to increase the purity of the outlet oil and water. Once the level of the separated oil exceeds the level of the entrance 56 of the oil pump housing 20, the separated oil flows into the oil pump housing 20 where it is again flung to the periphery of the pump cavity 46. A plurality of circumferentially spaced radial vanes 58 in the oil pump cavity 46 ensure that the rotational velocity of the oil is maintained. As the oil level in oil pump cavity 46 rises above the periphery of the stationary oil pump disk 44a in the disk pump assembly 44, it impinges on the plurality of circumferentially spaced vanes 60 disposed in the oil pump disk 44a. The vanes 60 redirect the oil flow radially inward and pump it to the central passageway 60 in the outlet tube assembly 36 to flow axially out of the separator to be collected.

Separated water at the periphery of the rotating drum 12 at the aft end (i.e. left in FIGS. 1 and 2) of compartment 48a flows axially through circumferentially spaced passages 62 formed in the periphery of oil pump housing 20 and the circumferentially spaced passages 64 formed in the rotating drum divider 22. Flow of the water then continues radially inward through passages 66 formed in the energy recovery disk 26. The function of the energy recovery disk 26, which is clamped between the rotating drum divider 22 and the water pump housing 24, is to reduce frictional energy losses due to vortex flow which would occur if this mechanism weren't provided. After flowing radially inward to the inside diameter of the energy recovery disk 26, the water flows axially back to the water pump cavity 48 where it is flung to the outer periphery of the walls defining this cavity.

Operation of the water pump is essentially the same as the operation the oil pump. Namely, the circumferentially spaced radial vanes 70 formed in the periphery of the water pump housing 24 maintain the rotational velocity of the water. As the water level in water pump housing 24 rises past the periphery of the stationary water pump disk 44b of the disk assembly 44, the circumferentially spaced vanes 72 in the water pump disk 44b redirect the water radially inward and pump it to the water outlet through annular passage 74 between the outlet tube of the oil pump disk 44a and the outlet tube of the water pump disk 44b. Because of the lower viscosity of the water, the stationary water disk pump 44b can have a narrower cross section than that of the stationary oil disk pump 44a.

Conductivity sensors 18 are utilized to ensure that the oil does not contaminate the water outlet. In the preferred embodiment the conductivity sensor includes a pair of suitable metal electrodes 76 mounted a fixed distance apart on the upstream side of the oil pump housing 20 such that they are immersed in the fluid. This control concept utilizes the fact that oil and water have significantly different electrical conductivities. The electrodes are connected to one leg of a suitable bridge electrical circuit illustrated by the box 78 whose output is sensitive to changes in conductivity detected by the electrodes 76. The bridge circuit resistances are selected such that there is no voltage output from the bridge circuit 78 when the electrodes 76 are immersed in water. If the oil/water interface, i.e. line B migrates too far toward the periphery of the rotating drum 12, the electrodes will become immersed in oil, and the resulting change in conductivity sensed by electrodes 76 cause the bridge circuit 78 to produce an output signal. This signal which is in millivolts causes a suitable relay or controller represented by box 80 to close a suitable solenoid valve 82 to shut down the flow of water in conduit 84 connected to the water outlet of outlet tube assembly 36. With the water outlet closed, the oil/water mixture continuing to flow into the stationary inlet 42, and oil continuing to be pumped out of the oil outlet, the oil/water interface migrates away from the periphery of rotating drum 12 and places the electrodes into contact with the separated water again to null out the system. This causes the bridge circuit output to return to zero and triggering automatic opening of the solenoid valve 82 in conduit 84 to resume flow of the water.

There are several other approaches utilizing conductivity sensors to ensure purity of the output water that may be employed with this inventive separator concept. As for example, conductivity sensors located close to the inlet of the oil pump housing 20 may be used to control a valve in the oil outlet line. In this case, when the oil/water interface approaches too close to the inlet of the oil pump housing, the change in sensed conductivity may be used to close a valve in the oil outlet line and/or open a valve in the water outlet line until the oil/water interface recedes from the vicinity of the oil pump inlet.

Another approach for a conductivity sensor would be a dual level control which may be achieved by placing two sets of conductivity sensors on the upstream side of oil pump housing 20, one near the periphery of the rotating drum 12 and the other near the inlet 56 of the oil pump housing 20. In this case, the sensor near the periphery might trigger the restriction of the water outlet flow when the oil/water interface approached the periphery of the rotating drum 12 and the release of that restriction as the oil/water interface receded from the periphery. Likewise, the sensor located near the outlet flow when the oil/water approached the pump inlet, and the release of that restriction as the oil/water interface receded from the pump inlet.

And still another approach for conductivity sensing is utilizing a proportional control consisting of two parallel metal electrodes oriented radially along the upstream face of the oil pump housing 20, These electrodes would be part of a bridge circuit as described in the paragraphs above, The output of the bridge circuit would vary linearly with the position of the oil/water interface, This voltage output would proportionately vary the restrictions in the water and oil outlet lines in order to maintain an oil/water interface level in the rotating drum 12 consistent with the relative flow rates of oil and water entering the separator 10.

Passages in the water/oil separators are sufficiently large in order to accommodate debris and foreign matter, The disk pumps are designed to provide a grinding or macerating capability in order to reduce the size of any debris.

These systems depicted in FIGS. 1 and 2 will typically be mounted on a ship (although other environments are contemplated within the scope of this invention) and receive oil and seawater in from floating or ship-mounted oil skimming devices, The separators serve as oil concentrators by taking the skimmer output (contemplated as being 80% water) and concentrating the oil to better than 99% purity and returning substantially greater than 99% (or better) oil free water to the sea, This obviously affords a significant advantage. Since water is separated from oil at sea the skimmer collection vessel can collect up to five times as much oil before returning to port and off loading.

In addition to water/oil separation at sea, this invention is particularly useful for shoreline remediation by picking up oil near the shore as it is manually dislodged by high pressure water spray. Further, this invention would have utility in industrial applications where it could be applied in removing oil or other pollutants from water effluent, sumps or ponds. Such separators when utilized in a wastewater outlet could be continuously online so as to protect against an inadvertent spill and provide a warning of oil present in the industrial output.

As one skilled in tills art will appreciate the fluid separator 10 can be utilized for a sundry of applications as, for example, removing water from diesel oil, or to clean up shipboard bilges, or to remove impurities from industrial process flows. This invention is particularly efficacious for these applications because it affords advantages of compact size, rapid separation, i.e. high throughput, and high purity output.

Additionally, this invention can be reconfigured for applications in zero or partial gravity environments, such as those encountered in spacecraft. Obviously, the absence of gravity makes the separation of liquids from process gas flows difficult. This invention sufficiently reconfigured as will be described hereinbelow, affords advantages in a number of different applications, as for example, the separation of heat exchanger humidity condensate from process air flow, and the separation of urine from waste collector system air flow, i.e. commodes.

While centrifugal separators are currently used in many applications in spacecraft, all of these separators use pitot tubes to collect the separated liquid. The use of pitot tubes causes much turbulence in the separated liquid, which results in high power consumption, which is a distinct disadvantage in spacecraft, and problems with gas inclusion in the output liquid. The disk pump feature of my fluid separator will greatly reduce power consumption and virtually eliminate the gas inclusion problem.

Figure 3:
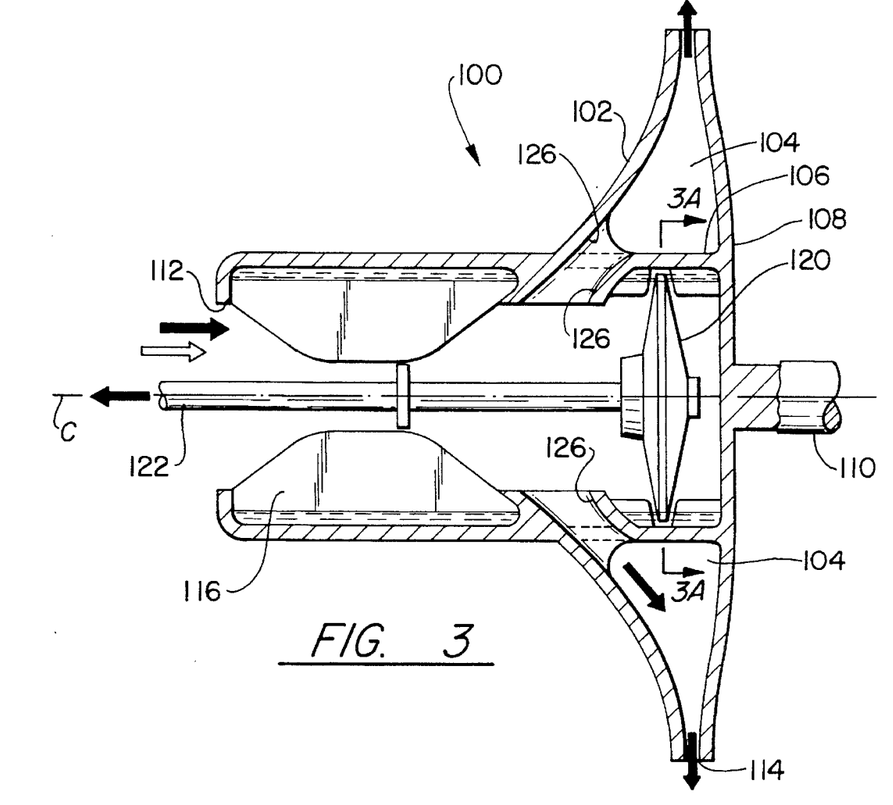
FIG. 3 is a sectional view and schematic representation of a liquid gas separator capable in a zero gravity atmosphere.

The liquid/gas separator of this invention is schematically depicted in FIG. 3 and like the oil/water separator a rotating drum generally designated by reference numeral 100 is rotatably mounted about the rotating axis C. As mentioned in the above paragraphs, this configuration illustrates the basic design that can be employed in a spacecraft life support system to separate the condensing heat exchanger humidity condensate water from process air flow prior to returning the air to the spacecraft cabin. In the microgravity environment of space, the water condensed in the heat exchanger would be entrained in the process air flow and carried to the separator inlet.

The rotating bowl 100 consists of a cylindrical housing 102 flaring outwardly at its aft end and containing a plurality of circumferentially spaced separator impellers 116 extending radially inward toward axis C adjacent to the centrally disposed inlet 112. The fan repellers 104 in the aft end of the rotating bowl 100 draw the air and entrained water droplets into the inlet 112. The separator impellers 116, located just inside the inlet impart a rotational velocity to the air and the entrained water droplets. As with the oil/water separator depicted in FIGS. 1 and 2, the heavier water is centrifuged to the periphery of the rotating bowl 100. The lighter air remains in the center of the rotating bowl 102 and is accelerated out the air outlet 114 by the fan impellers 104. The air is admitted to the fan impellers via a plurality of circumferentially spaced air inlets 116. Fan impellers are circumferentially mounted in the larger diameter aft portion of the bowl 100 and extend radially outward from the outlets of the air passages 126 to the air outlet 114. The bowl 100 is cantilever mounted to shaft 110 which is rotatably driven by a suitable motor (not shown).

Figure 3A:
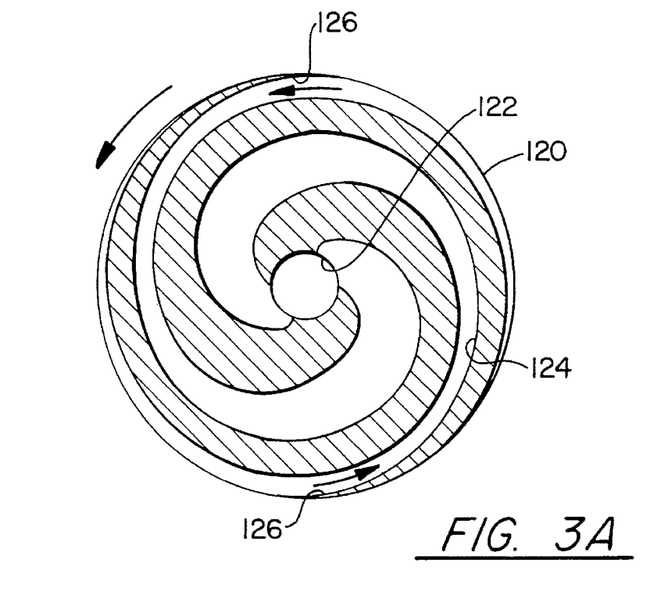
FIG. 3A is a sectional view taken through the lines 3A—3A of FIG. 3.

A stationary disk pickup and pump 120 and elongated liquid outlet tube 122 are mounted to an external assembly (not shown) and fixed centrally inside of bowl 100. The disk pickup and pump 120 serves to collect the water flung to the periphery of bowl 100 and pump it through the outlet tube 122 to be utilized for other purposes as desired. The disk pickup and pump 120 serves similar purposes as the water pump 22 and water pump disk 44b depicted in FIGS. 1 and 2. FIG. 3A depicts an enlarged sectional view taken through the transverse axis of the disk pickup showing the flow passages. As noted therein, the pumping passages 124 diverge to increased cross sectional areas proceeding from the opposing water inlets 126 to the outlet 122 to convert the velocity pressure to static pressure before dumping the water into the outlet 122.

As is apparent from the foregoing description of the liquid/gas separator embodiment in FIGS. 3 and 3a, and as one skilled in this art will appreciate, this embodiment provides high liquid flow with low drag on the stationary disk 120. To attain an increased delivery pressure, it would be necessary to immerse the disk deeper into the water formed at the periphery of the bowl 102. However, it follows that, drag increases as a function of the depth the disk is immersed into the water. Obviously, the increased drag has an adverse effect on power consumption. For low flow, high delivery pressure separators, disk drag can account for a significant portion of the total power consumption of the separator.

Figure 4:
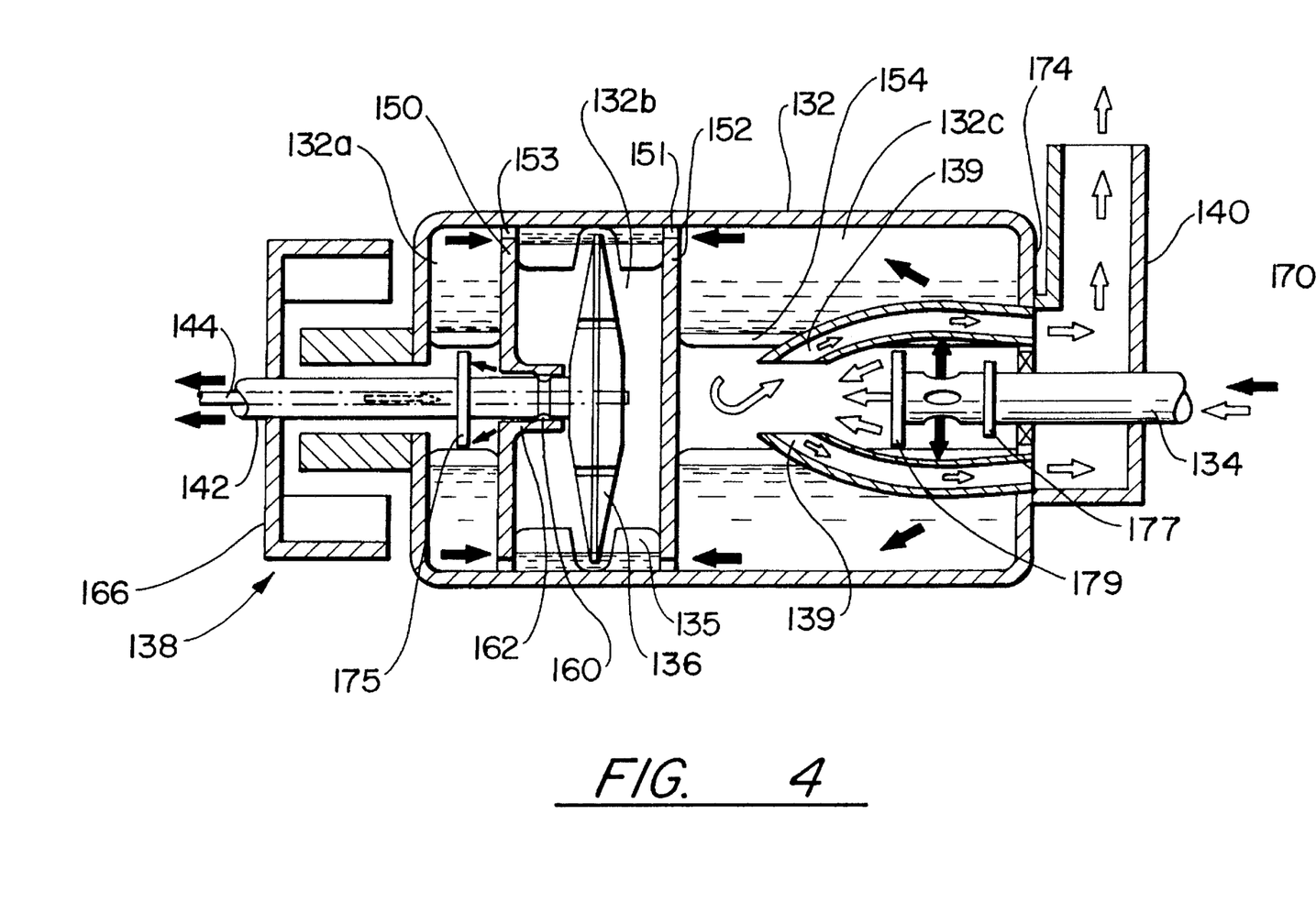
FIG. 4 is a cross sectional view and schematic representation exemplifying another embodiment of the type of separator depicted in FIG. 3.

Utilizing the same principles as disclosed herein, FIG. 4 exemplifies another embodiment of this invention to alleviate the problem alluded to in the immediately above paragraph. FIG. 4 schematically illustrates the water/air separator generally depicted by reference numeral 130 for reducing the drag in a high delivery pressure separator and thereby minimizing power consumption and comprises a rotating bowl 132, stationary inlet 134, stationary disk pump 136, motor assembly 138, stationary gas manifold and outlet 140, stationary water tube and outlet assembly 142 and gas pressurization tube and inlet 144.

The rotating bowl 132 is a hollow cylindrical closed member with inner annular spaced walls 150 and 152 dividing the bowl into three separate compartments 132a, 132b and 132c. The separating compartment 132a is isolated from the disk pump compartment 132b similar to the embodiment depicted in FIGS. 1 and 2. Liquid and gas are admitted internally of bowl 132 through the stationary inlet where it impinges on the circumferentially spaced vanes or paddles 154 for accelerating the water and flinging it to the periphery of bowl 132 to form a cylindrical mass of water and the lighter density gas is forced into the multiple gas rotating outlet ports 139 circumferentially spaced about the inlet 134. Ports 139 by virtue of the rotational movement serves as inducer to assist in pumping the gases through the gas manifold and outlet 140. The gas is ported to the stationary gas manifold 140 to be used or dumped as desired.

Axial passages 151 and 153 formed in the periphery of walls 150 and 152, respectively, allow the water to flow into compartments 132b and 132a. Compartment 132b housing the stationary disk pump 136 is pressurized by admitting gas pressure through the inlet tube 144 and hence, reduce the depth of the water cylinder adjacent the periphery of the bowl 132 confined within compartment 132b. A suitable seal 160 is attached at the journal portion 162 for assuring the water is contained in the compartment 132b. The stationary disk pump 336 is substantially similar to the water pump housing 24 and water pump disk 44b depicted in FIGS. 1 and 2 and for the sake of simplicity and convenience are not being described and are incorporated by reference herein. The disk pump 136 serves to pickup the water at the periphery of the bowl 132 and pump it through the liquid outlet of assembly 142 for delivery and use as desired. Circumferentially spaced fins or paddles 135 attached to the inner wall of bowl 132 within the compartment 132b serve to maintain the velocity of the water.

As is apparent from the foregoing, the liquid level is allowed to increase in the separator section of bowl 132. However, since the external gas supply pressurizes compartment 132b, this will cause the liquid level to be reduced. Pressure equalizing ports 133 and 135 may be used to equalize the pressure acting on disk pump 136. This permits the disk pump 136 to behave as if it were submerged to the level in the compartment 132c, but at a much reduced drag because the liquid level in compartment 132b is suppressed by gas pressure. Obviously, this approach requires added complexity as compared with the embodiment depicted in FIG. 3, particularly because of the requirement of an external gas pressurization source and a rotating seal 162 needed to isolate and pressurize the pump compartment 132b. However, the efficiency of this embodiment is very high.

The bowl 132 is rotated by the electric motor assembly 138 (A.C. or D.C.) consisting of the stator 166 and rotor 168 where the rotor is attached to or formed integrally with the end wall 170 of the bowl 132 and supported by bearings 172 and 174 located in journal 162 and adjacent to the liquid and gas inlet 134 at a central opening formed in end wall 174 of the rotating bowl 132. To minimize leakage, deflectors 175, 177, and 179 are located where there are potential leakage problems.

Figure 5:
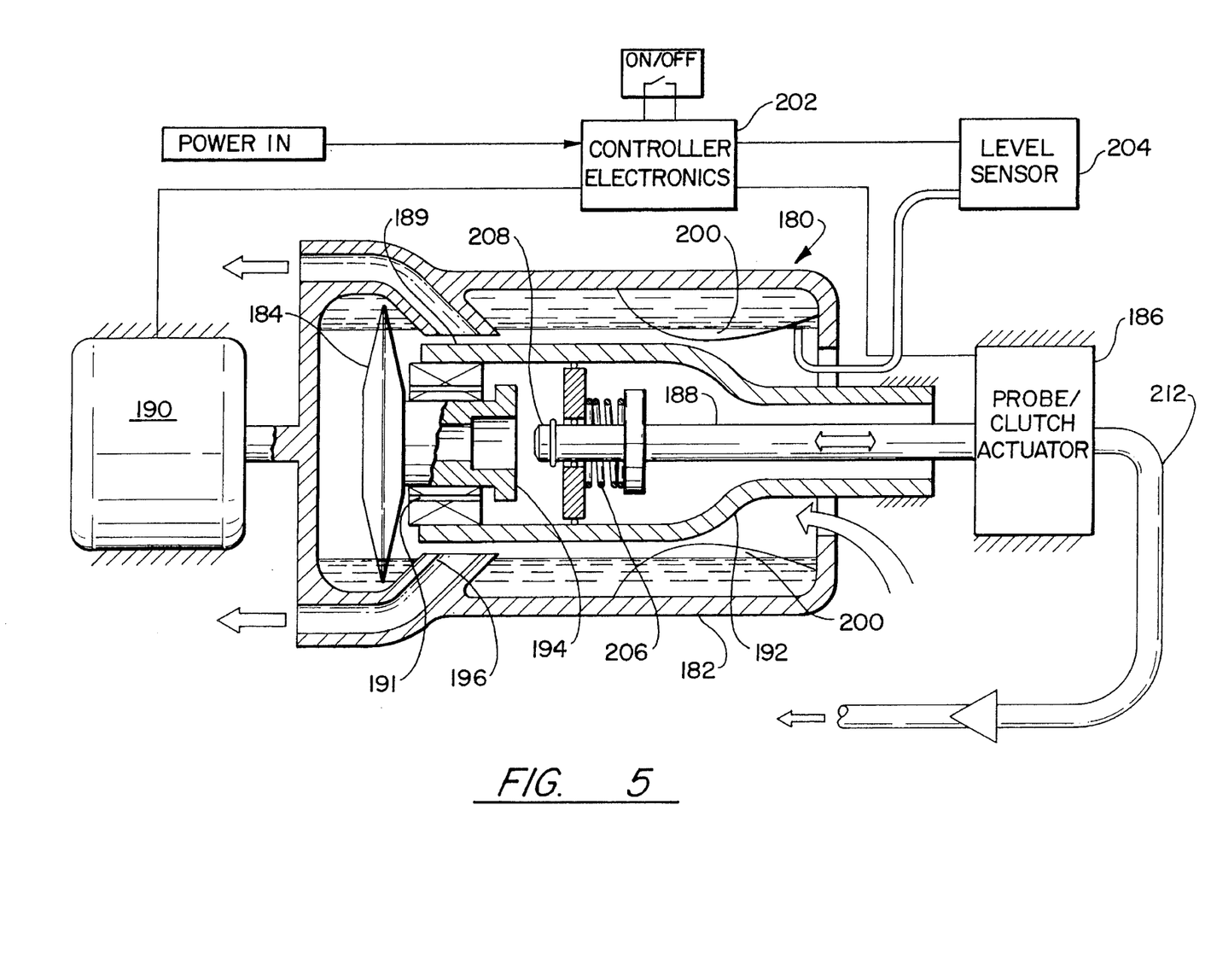
FIG. 5 is a sectional view in elevation and schematic illustrating another embodiment of the type of separator depicted in FIG. 3.

In certain applications it is advantageous to allow the disk pump to rotate while it isn't being utilized to perform its pumping function. The disk pump is held stationary while performing its pumping function. The big advantage of this type of system is the savings in power consumption. FIG. 5 exemplifies this type of system and again employs the basic principles utilized by the other separator systems disclosed herein. The liquid/gas separator depicted in FIG. 5 is a sectional and schematic view of the separator generally illustrated by reference numeral 180 as comprising a rotating drum or bowl 182, the disk pump 184, clutch 186, probe 188, and electric motor 190.

The separator 180 includes a centrally disposed cylindrically shaped inner housing 192 supporting the probe 188 and bearings 189 for rotatably supporting the disk pump 184 and the integral liquid outlet port 194 for pumping the separated liquid as will be described immediately below. The bearings 184 include axial vent holes to vent the air and liquid during start up.

Similar to the configuration depicted in FIG. 4, separator 180 includes multiple air outlet ports 196 for venting the separated gases. Similar to the configurations of the other separators disclosed herein, bowl 182 is continuously rotated by motor 190. The air/liquid mixture admitted internally in bowl 182 encounters the separator vanes 200 that accelerate the mixture and separate the liquid from the gas. The heavier liquid is flung to the periphery of the bowl 182 and forms a cylindrically shaped mass. Similar to the disk pump 44b depicted in FIG. 1, the disk pump 184 extends so that the inlet is immersed in the water. When the probe is in the position shown in FIG. 5, i.e. while disengaged, the disk is freewheeling by virtue of being rotated by the rotating water mass. Suitable means are utilized to actuate the clutch when water is to be removed from the separator. For this purpose a suitable electronic controller depicted by box 202, senses the water level by sensor 204, which causes the electronic controller to convert this signal to an output signal to activate the spring loaded probe 188. The probe 188 is held out of engagement of the water outlet port 184 by spring 206 urging the probe toward the left as viewed in the FIG. 5. When the clutch is activated, the probe is urged toward the right so that the valve end 208 seats into port 194 and the seal 210 engages the wall of port 194 to stop the rotation of disk pump 184. When in the stationary position, disk pump 184 pumps the water out of the bowl 182 via an internal passageway in probe 208 which is fluidly connected to conduit 212. A suitable one way check valve allows the water to flow out of the system upon reaching a predetermined pressure. An on/off electrical switch initially activates the electronic controller 202 and the electric motor 190. The primary purpose for the clutch and probe is to allow the disk to stop and allow it to be purged of all the air prior to when it is activated to pump the liquid.

It is apparent from the foregoing that the freewheeling disk pump 184 consumes almost no power until it is stopped by the mechanical clutch 186 actuated by the liquid level sensor 204. Once the disk pump 184 is stopped, the disk pump 184 causes the liquid to be pumped out of the rotating bowl 182 at a high flow rate. At high flow, the disk provides good pumping efficiency and high outlet pressure. As the liquid level in the bowl is reduced, the level sensor 204 release clutch 186 allowing the disk pump to freewheel again. The rotating bowl 182 acts as an accumulator again until the liquid level rises sufficiently to actuate clutch 186 for starting the cycle over again.

The liquid/gas separator exemplified in FIG. 6, again using the same principles as utilized by the other separators depicted herein, is particularly useful in a microgravity environment where it is necessary to separate the liquid from gas in a rotating bowl at very low rotational speeds. As one skilled in this art will appreciate, it is the pumping pressure requirement that demands high rotational speeds. In a gravity field, higher rotational speeds are required to keep the cylindrical mass of liquid from collapsing. Since power consumption is proportional to the cube of rotational speed, it is highly desirable to run at the minimum rotational speed consistent with good separation. The separator depicted in FIG. 6, which is particularly efficacious for operation with these parameters includes the rotating bowl 230 suitably rotated by a motor (not shown) connected to shaft 232. In this configuration the disk pump 231 is fixed internally of bowl 230 and consists of two parallel disks 234 and 236.

Figure 6:
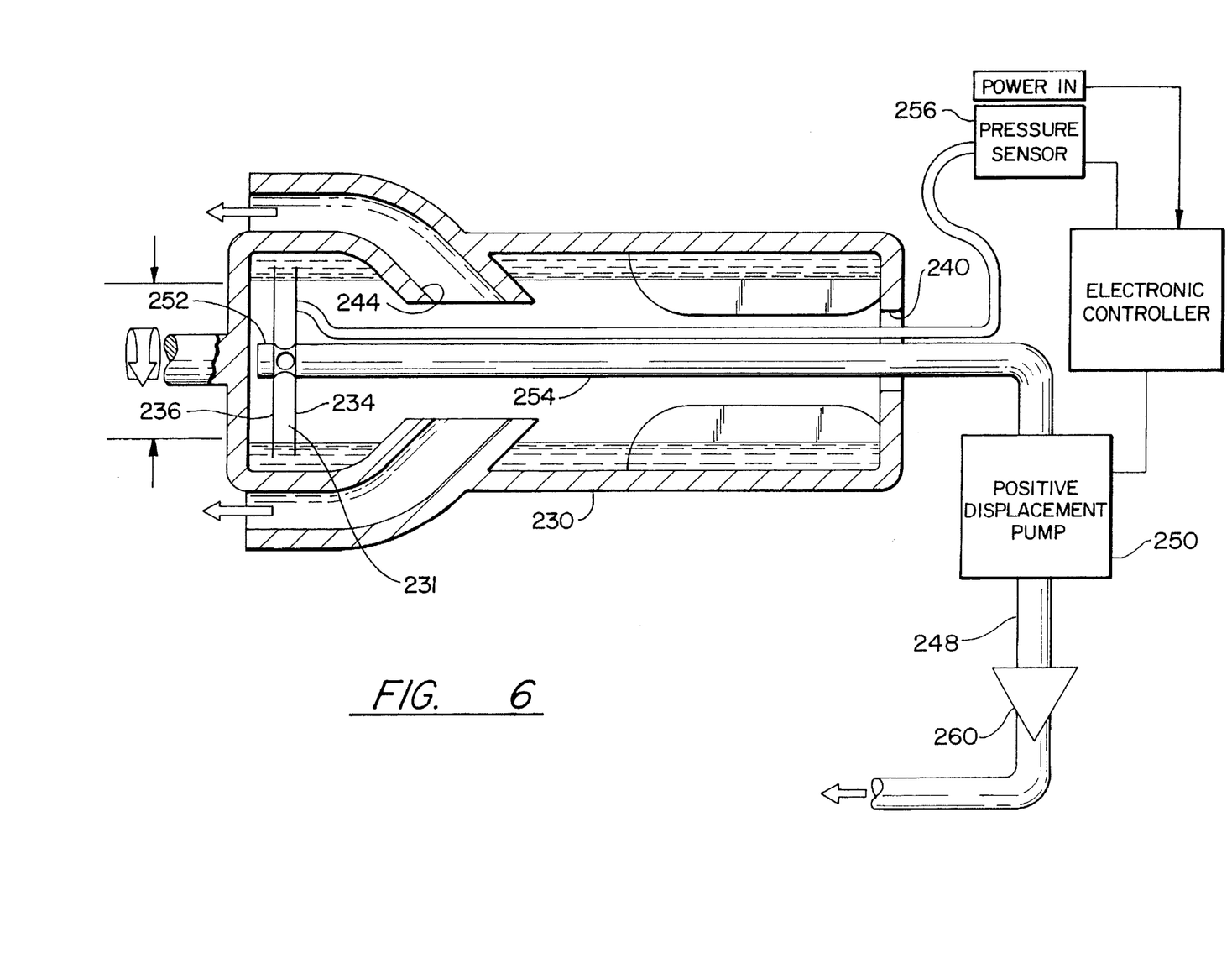
FIG. 6 is a sectional view in elevation and schematic exemplifying another embodiment of this invention utilizing a positive displacement pump for minimizing power consumption.

The liquid/air mixture is admitted internally of bowl 230 through inlet 240 where it encounters the separator impellers 242 for accelerating the mixture and causing it to separate, flinging the heavier liquid to the periphery of bowl 230. The air is collected by the multiple outlet ports 244 (similar to gas outlet ports 139 depicted in FIG. 4) and vented. A suitable positive displacement pump 250 disposed in conduit 248 is fluidly connected to disk pump 231 via outlet port 252 and the stationary outlet tube 254 disposed along the axial center line X of rotating bowl 230. A suitable pressure sensor 256 and electronic controller 258 sense the static pressure of the liquid in the disk pump 231 and controls the speed of the positive displacement pump 250 to maintain the liquid level just covering the periphery of the disk pump 231 so as to ensure gas-free delivery of the liquid with minimal drag. Pumping of the liquid out of the rotating bowl 230 is intermittent by virtue of the judicious actuation of the positive displacement pump 250. The one-way check valve 260 is disposed at the outlet of positive displacement pump 250 to permit the flow of liquid out of the system upon reaching a predetermined pressure.

Obviously, the conductivity sensor disclosed in the embodiment depicted in FIGS. 1 and 2 could be substituted for the pressure sensor utilized in the separator depicted in FIG. 6. As with the pressure sensor, the conductivity sensor would activate the positive displacement pump when the level of the water reaches a predetermined depth.

What has been shown by the embodiment depicted in FIG. 6 is a separator that not only requires a low speed for the rotating bowl which accounts for reduction in power consumption, the use of a positive displacement pump instead of the customary centrifugal pump utilized in space applications contributes to a more efficient separation system. This is particularly true because of the low liquid flow rates that are generally encountered in space applications. Another advantage for the separator depicted in FIG. 6 is that the liquid quantity can be simply and accurately determined by counting the strokes or revolutions of the positive displacement pump. This would be particularly useful in spacecraft urine separators where data on urine collected would be helpful in the designing of life support systems for future missions or for human metabolic studies.

Although this invention has been shown and described with respect to detailed embodiments thereof, it will be appreciated and understood by those skilled in the art that various changes in form and detail thereof may be made without departing from the spirit and scope of the claimed invention.

I claim:

1. A fluid/liquid separator for separating mixture of fluid and liquid into separate components of fluid and liquid comprising a rotating bowl having a central axis and having a first compartment and a second compartment in axial alignment with said first compartment, means for imparting rotary motion to said rotating bowl, an inlet in said first compartment for receiving a mixture of fluid and liquid, circumferentially spaced paddle means disposed around said central axis for accelerating the fluid and liquid mixture and together with said means for imparting rotary motion attaining an angular velocity to centrifuge the fluid and liquid to separate into components of fluid and liquid, a fluid inlet in said second compartment axially extending into said first compartment to flow liquid toward said central axis, a fluid outlet radially spaced from said fluid inlet in fluid flow relationship in said in one of said first or second compartment for expelling said fluid therefrom, stationary pump means concentrically mounted relative to said central axis having an inlet adapted to being immersed in said separated liquid and a liquid passage means coaxially mounted about said central axis and connected to the stationary pump means, and an outlet at the end of said liquid passage means for discharging said liquid from said second compartment.

2. A fluid/liquid separator for separating the mixture of fluid and liquid into separate components of fluid and liquid as claimed in claim 1 wherein said fluid is air and said liquid is water.

3. A fluid/liquid separator as claimed in claim 2 wherein said fluid outlet radially spaced from said inlet is in said first compartment.

4. A fluid/liquid separator as claimed in claim 3 wherein said rotating bowl includes a third compartment in axial alignment with said first compartment and said second compartment, an axial inlet means fluidly connecting said third compartment with said second compartment for flowing water therein, a gas inlet for leading a pressurized gas into said second compartment for pressurizing said second compartment and reducing a radial extent of liquid rotating in said second compartment whereby the drag therein is reduced and the efficiency of the separator is increased.

5. A fluid/liquid separator as claimed in claim 4 including additional paddle means attached to said rotating bowl disposed in said second compartment to maintain the velocity of the rotating liquid therein.

6. A fluid/liquid separator for separating mixture of fluid and liquid into separate components of fluid and liquid as claimed in claim 2 including impeller means disposed adjacent said fluid inlet to pump the air through a fluid outlet in said first compartment.

7. A fluid/liquid separator as claimed in claim 1 wherein said fluid outlet radially spaced from said inlet is in said second compartment.

* * * * *